(12) United States Patent
Buchheit (10) Patent No.: US 9,419,687 B1
(45) Date of Patent: Aug. 16, 2016

(54) INTERMEDIATE FREQUENCY BROADCAST OF EMULATED PASSIVE RFID SIGNAL FROM A COMPUTING DEVICE

(71) Applicant: Brian K. Buchheit, Davie, FL (US)

(72) Inventor: Brian K. Buchheit, Davie, FL (US)

( * ) Notice: Subject to any disclaimer, the term of this patent is extended or adjusted under 35 U.S.C. 154(b) by 393 days.

(21) Appl. No.: 14/158,384

(22) Filed: Jan. 17, 2014

Related U.S. Application Data

(63) Continuation of application No. 13/452,156, filed on Apr. 20, 2012, now abandoned.

(51) Int. Cl.
*H04Q 5/22* (2006.01)
*H04B 5/00* (2006.01)

(52) U.S. Cl.
CPC ................................. *H04B 5/0062* (2013.01)

(58) Field of Classification Search
CPC ............. H04B 5/0062; G06K 7/0008; G06K 19/0723; G06K 7/10039; G06K 2017/0045; G08B 13/2462; G01R 33/093; G01R 33/098; G11C 11/161; Y10T 428/1114
USPC ....................................................... 340/10.3
See application file for complete search history.

(56) References Cited

U.S. PATENT DOCUMENTS

| | | | | |
|---|---|---|---|---|
| 2004/0176032 A1* | 9/2004 | Kotola | ................. | G06K 7/0008 455/41.2 |
| 2006/0103535 A1* | 5/2006 | Pahlaven | ............ | G06K 7/10306 340/572.1 |
| 2006/0118622 A1* | 6/2006 | Zatloukal | ............. | G06K 7/0008 235/382 |
| 2007/0194936 A1* | 8/2007 | Hoshina | ............. | G06K 7/10237 340/572.8 |
| 2008/0090520 A1* | 4/2008 | Camp | ...................... | H04B 5/00 455/41.2 |
| 2008/0304512 A1* | 12/2008 | Jung | ..................... | H04M 1/663 370/646 |

* cited by examiner

*Primary Examiner* — Omer S Khan
(74) *Attorney, Agent, or Firm* — Patents on Demand P.A.; Brian K. Buchheit; Scott M. Garrett (57) ABSTRACT

A radio frequency signal is transmitted by a powered mobile device that emulates a signal of a passive radio frequency identification (RFID) device signal. The emulated signal is transmitted at an intermediate frequency communication (IFC) range, which is at least a magnitude of five greater than a range at which the passive RFID device is able to receive the radio frequency signal from a NFC reading device (referred to as an NFC range). The NFC reading device responds to the transmission signal from the powered mobile device as if an equivalent signal containing the transmission information were sent from the passive RFID device. This permits a powered mobile device to emulate a passive RFID device at an expanded range.

20 Claims, 5 Drawing Sheets

INTERMEDIATE FREQUENCY BROADCAST OF EMULATED PASSIVE RFID SIGNAL FROM A COMPUTING DEVICE

CROSS-REFERENCE TO RELATED APPLICATIONS

This utility application claims the benefit of U.S. application Ser. No. 13/452,156 filed Apr. 20, 2012 titled "INTERMEDIATE FREQUENCY BROADCAST OF EMULATED PASSIVE RFID SIGNAL FROM A COMPUTING DEVICE, which claims the benefit to U.S. Patent Application Ser. No. 61/478,211, filed Apr. 22, 2011. The entire contents of Ser. No. 13/452,156, 61/478,211 are incorporated by reference herein in their entirety.

BACKGROUND

The field of the disclosure is the field of radio-frequency identification (RFID), and more specifically devices with RFID signal broadcasting or near field communication capabilities emulating passive RFID signals.

Radio-frequency identification has long been coupled with devices such as smart cards, packaging, specialized transponders and the like, for purposes of identification and authentication. More specifically, RFID technology is most notably utilized in end-user applications for access management, toll collection and contactless payment. As such, individuals oftentimes carry a multitude of RFID tagged objects.

For example, a user may carry a smart pass for public transportation, a smartcard for access to his or her work building, as well as a separate RFID enabled key fob for access to his or her home, and a transponder in a vehicle for toll collection. Keeping track of all of the separate devices can be cumbersome. Additionally, using the devices for their intended purpose requires removing them from their storage place (in a purse, clothing pocket or dedicated storage compartment) in order to bring them within read range (or near field communication range) of the RFID reader or interrogator.

Near field communications technology has made it possible for mobile wallet applications to be implemented on smartphones. Now users can pay for their coffee, for example, via a cell phone application capable of communicating with. However, near field communication is restricted by its very nature to small transmission ranges. Users still have to remove their mobile phones (or computing devices) and bring them within physical distance of the RFID readers. In some cases, use of the near field communication technology even requires touching the computing device to the RFID interrogator to effect proper communication between the RID enabled device and the target RFID reader.

DETAILED DESCRIPTION

Conventionally, there exist three distinct types of RFID technology: active, passive and semi-passive. Active and semi-passive tags are both battery powered and have higher read ranges. Active tags transmit signals/energy encoded in the tag to the reader. Passive RFID tags do not have an on board power source but rather wait for a carrier signal emitted by the passive RFID reader to gain power through induction. Backscatter technology is utilized by both passive and semi-passive (or battery assisted tags) to modulate the incoming carrier signal before returning information to the reader.

Passive tags are less costly and thus more popular than active RFID tags. Active RFID tags are primarily utilized for applications requiring larger read ranges and their own power source to function properly (e.g., toll collection). In contrast, passive RFID tags are used in environments that allow smaller read ranges (e.g., access management and contactless payment). The required proximity allows for an added level of security against accidental and unintentional implementation of the RFID tagged device's transmissions.

Near field communication (NFC) technology devices and adapters (such as those for devices without integrated hardware for near field communication) allow mobile computing devices to engage in contactless card emulation. In other words, passive RFID signals can be emulated over NFC ranges. Near field communication, however, is still constrained to small read ranges for implementation (for example, up to a maximum of 20 cm). This close proximity requirement can eliminate the ability of NFC enabled devices to be utilized for applications requiring larger read ranges for correct operation (e.g., toll collection), or user convenience (e.g., building access).

One embodiment of the disclosure presents a computer program product able to emulate passive RFID signal reflection for a predetermined set of user RFID devices by actively transmitting on the required transmission frequency. Another embodiment of the disclosure can be a computing device that can utilize the computer program product to present an all-in-one access and contactless payment or access device (including toll payment which is conventionally achieved with an active RFID tag).

In yet another embodiment, a location dependent activation module can control activation of transmission and the specific signal to be transmitted. This activation can occur depending on the computing device location in relation to a set of pre-programmed RFID reader specific locations and respective IFC ranges determined by the device user. In another embodiment of the disclosure, a widget can control the computer program product and its behavior. Widget settings or preferences can be controlled by the computing device user.

As will be appreciated by one skilled in the art, aspects of the present invention may be embodied as a system, method or computer program product. Accordingly, aspects of the present invention may take the form of an entirely hardware embodiment, a software embodiment (including firmware, resident software, micro-code, etc.) where the software embodiment can include a storage medium (which can be a tangible, physical, non-transitory storage medium) within which the software resides, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer program stored on a computer readable storage medium may be propagated over a distance via a computer readable signal medium.

The computer readable storage medium can be a tangible, non-transitory medium. The computer readable storage medium can be a physical device or part of a physical device in which information is digitally encoded. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
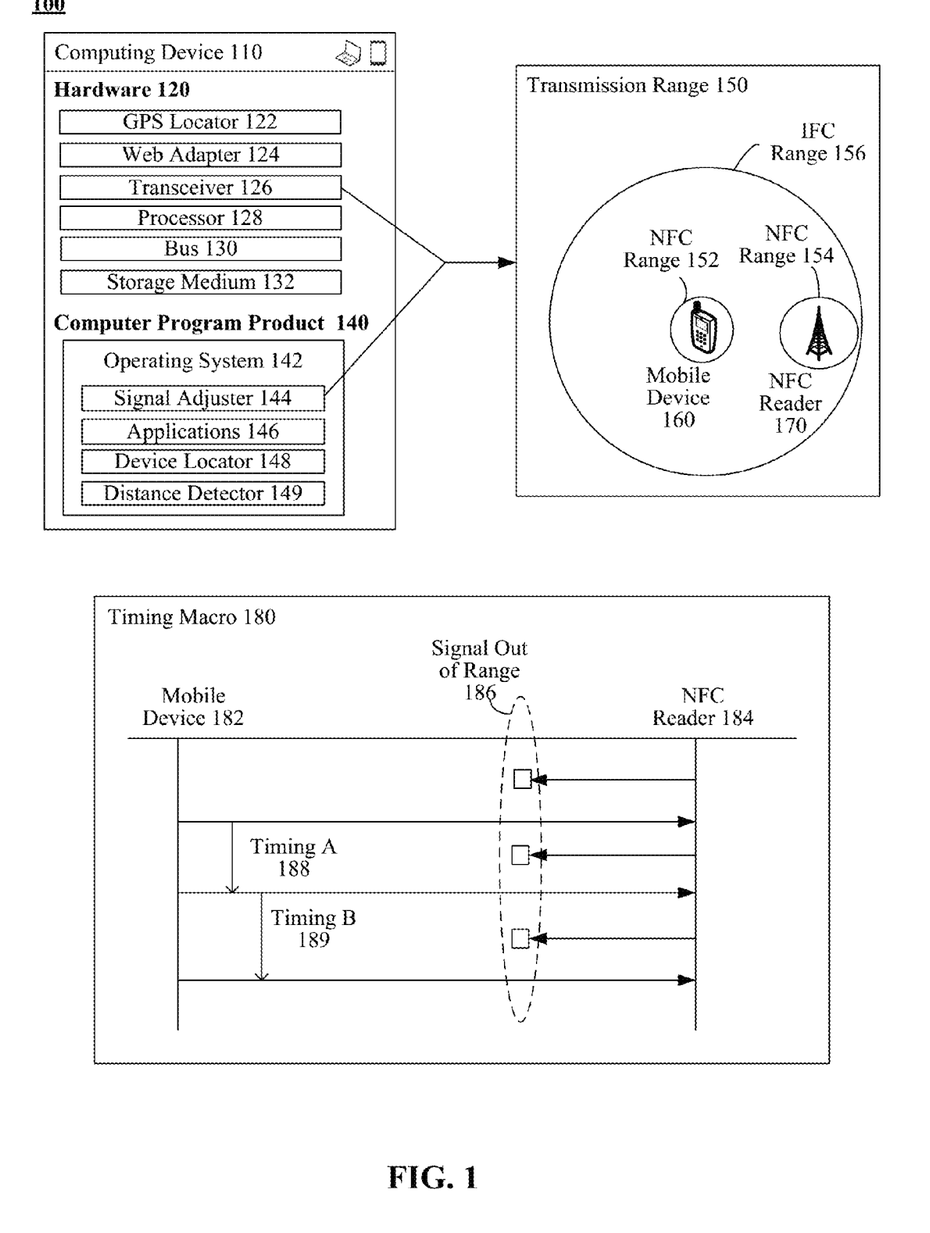
FIG. 1 shows a schematic diagram of a system for use of emulated RFID signal transmission in accordance with an embodiment of the inventive arrangements disclosed herein.

FIG. 1 shows a schematic diagram of a system 100 for use of emulated RFID signal transmission in accordance with an embodiment of the inventive arrangements disclosed herein. System 100 shows a computing device 110 that includes hardware 120 and one or more computer program products 140. The computing device 110 can be any mobile apparatus or device capable of receiving and transmitting signals in the radio frequency range in line with existing protocols, for example ISO14443A.

The computing device 110 can be, but is not limited to, a personal computer, a smart phone, and the like. Device 110 can be a general purpose computing device able to have its functionality modified by updating or changing installed applications, can be a special purpose computing device designed for a specific set of functionality that is not user modifiable (or minimally so, such as through a firmware upgrade), or can be a device with an intermediate level of user modifiability (i.e., plug-ins or apps can be installed by a user who is otherwise not able to modify core functionality of the device).

The hardware 120 can include GPS locator 122 and web adapter 124. GPS locator 122 can be utilized to keep track of the device's 110 geographical location. Alternately, web adapter 124 can be utilized to provide the capability to triangulate a device 110 geographical position based on the nearest available wireless networks. GPS locator 122 and web adapter 124 can function in conjunction with computer program products 140 device locator 248 and distance detector 149. Distance detector 149 can be utilized to resolve whether or not device 110 is within physical intermediate frequency read range of a target RFID reader associated with applications 146 configured to function via RFID communication. Utilizing the on board hardware with these computer program product modules, auto-transmission of emulated passive RFID signals when located within IFC range of RFID readers can be established.

The hardware 120 can also include one or more processors 128 able to execute programmatic instructions of one or more computer program products 140. The processor 128 can be connected to other hardware 120 components, which include storage medium 132, via a bus 130. Storage medium 132 can be a non-transitory storage medium, such as a hard drive, Random Access Memory (RAM), a solid state drive, an optical storage medium (DVD disk, BLU-RAY disk), and the like. Hardware 220 can include ports for interacting with external output components or can include one or more embedded or integrated output components (e.g., transceiver 126).

Transceiver 126 can receive and transmit signals in accordance with an embodiment of the disclosure. For example, the transceiver can include one or more antennas. The antenna(s) can take the form of any known antenna, including but not limited to, a bistatic, a monostatic, a dipole, a dual dipole, an isotropic or a slotted antenna. Computing device 110 can utilize a single antenna for all of its purposes, or can alternatively utilize one antenna to receive signals and another antenna to send signals. Signals received and transmitted can include, but are not limited to, emulated passive RFID signals.

The computer program products 140 of computing device 110 can include an operating system 142, one or more applications 146 executing on top of the operating system, firmware, and the like. Applications 146 can, for instance, be a mobile e-wallet application, a mobile toll account application, a public transportation smartcard holder application, an access management application, and the like. Each one of the applications can have multiple sub-applications.

For example, the e-wallet can have a separate module for payments via American Express and a separate module/protocol to follow for payment by Visa. As a toll collector or public transport card application, sub-modules can include state or city specific access or payment accounts. For example, a toll payment application can include a Florida Sunpass, a New Jersey EZPass, a New York EZPass, a New York City Metro Pass, and so forth. State or locality specific toll applications can ensure a user receives the benefit of state or locality specific discounts while traveling.

Signal adjuster 144 can serve to emulate a passive RFID signal. During the initial programming stages, the computing device 110 transceiver 126 can read and receive the RFID reader expected carrier wave from a specific smart card or access card. The signal adjuster 144 can be utilized to modulate a carrier signal received from an RFID interrogator during programming. The modulated carrier signal can then be stored on the computing device 110's storage medium 132 for future transmission to the specific RFID reader.

The computing device 110 can transmit at a larger distance/range than near field communication enabled devices. Utilizing the transceiver 126 and signal adjuster module 144 the transmission range can be adjusted (e.g., boosted). Boosting can be achieved by, for example, applying a multiplier to the signal to be emitted. A decrementor can be applied to adjust the emulated passive RFID signal to be transmitted as well. Intermediate frequency range (IFC) range transmissions can be crucial in certain applications, for example toll collection processes, which depend on larger distance reads in order to function.

When the passive RFID signal is boosted utilizing the signal adjuster 144, transmission range can be extended from the conventionally available near field communication to an extended range, i.e. intermediate field communications range. While near field communication range is conventionally limited to a transmission and read distance of roughly 20 centimeters, IFC can include transmission distances of about one foot to ten yards.

This difference in communications ranges is illustrated by the depiction of transmissions range options 150. An NFC enabled mobile device 160 and NFC reader 170 have limited NFC ranges 152, 154 respectively. When the emulated passive RFID signal is adjusted (or boosted) for transmission, the mobile device 160 can broadcast the RFID signal emulation up to a range of IFC 156. Device 160 is no longer required to be within NFC range 154 of the reader to communicate and utilize the available applications (even if initially enabled via NFC). As long as NFC reader 170 is located within mobile device's 160 IFC range 156, the adjusted emulated passive RFID signal can reach the target RFID reader.

In certain instances, the RFID reader can require more responses from the mobile NFC enabled device than simply the "answer" that would unlock the door to be accessed or engage in the financial transaction. These required responses can be timed meaning that if an "answer" in the required sequence is not received within a predetermined time window, the transaction can time out and be unsuccessful. If the device 110 is out of NFC range of the target RFID reader, it cannot receive the requests for additional communication within a required communications sequence that is transmitted from the RFID receiver. In order to overcome this deficiency introduced with the innovative arrangements disclosed herein, a timing macro 180 can be implemented.

During the programming stage, the device 110 can record signals being sent from the target RFID reader along with signal specific timing information. Timing A (188) can represent the timing between the initial signal broadcasted to the NFC reader 184 and the next required response. Timing B (189) represents the timing required between the second and third response that the NFC reader 184 requires from the mobile device 182.

When timing information for such a communications sequence is known by device 182, out of range signals transmitted from the NFC reader 184 can be answered without having been received due to the signals being out of range 186. In such a way, the timing macro 180 can ensure that operating at IFC range, the mobile device 182 can operate as if within NFC range without the close proximity requirements associated with NFC.

Figure 2:
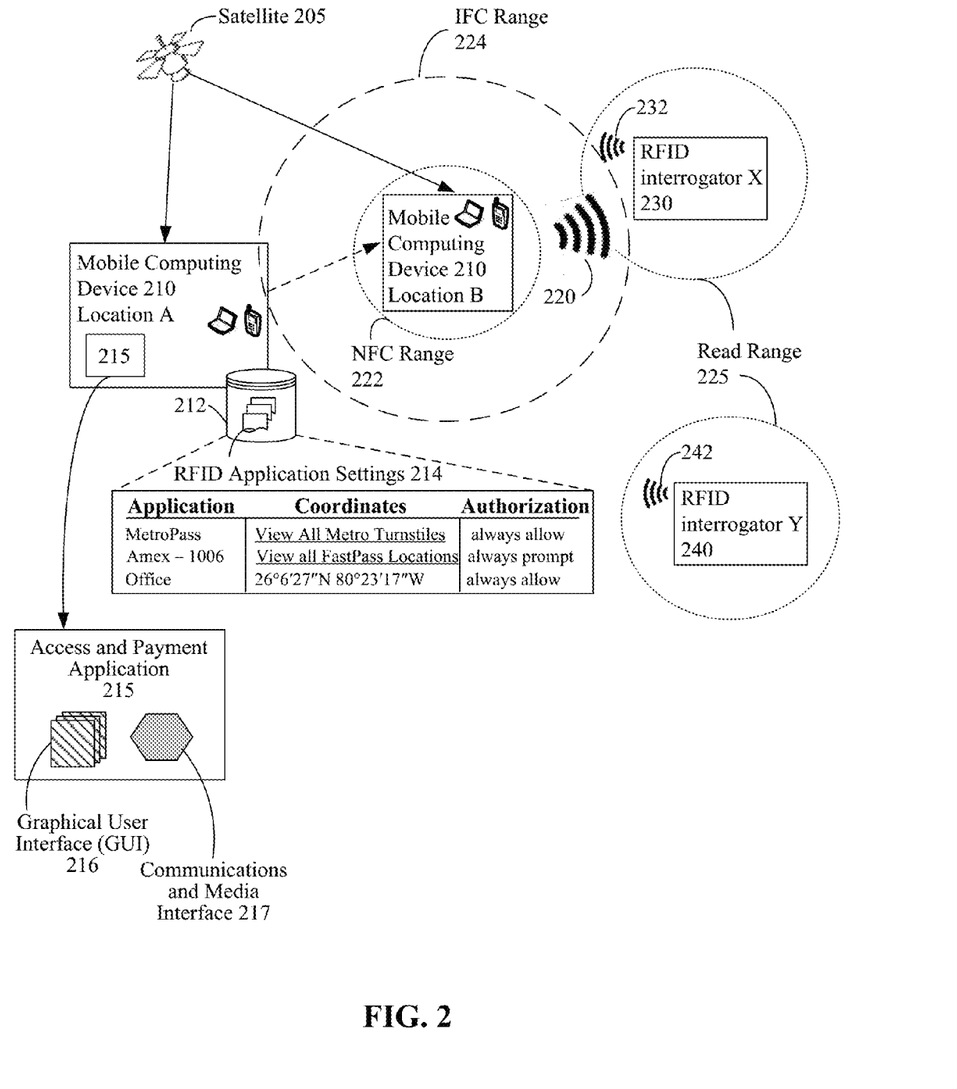
FIG. 2 shows a schematic diagram of a system for a GPS or Wi-Fi enabled computing device to auto-transmit an RFID signal in intermediate frequency range for an access control or contactless payment system in accordance with an embodiment of the inventive arrangements disclosed herein.

FIG. 2 shows a schematic diagram of a system 200 for a GPS or Wi-Fi enabled computing device to auto-transmit an RFID signal in intermediate frequency range for an access control or contactless payment system in accordance with an embodiment of the inventive arrangements disclosed herein. It should be noted that GPS and the use of satellites are not the only methods for locating a mobile device geographically. Other methods are contemplated.

Satellite 205 can geographically track mobile computing device 210 from location A to location B. Conversely, computing device 210 can determine its physical location via satellite 205 or other means (e.g., wireless networks, etc.). Mobile computing device 210 can include access and payment application 215 (such as a mobile wallet application relying on RFID communication with an interrogator), wherein access and payment application 215 can include a graphical user interface (GUI 216) and a communications and media interface 217.

A GUI 216 can represent the interaction mechanism by which a user can perform functions with and/or establish preference settings for application 215. Multiple GUIs 216 can exist, each presenting different data and/or functionality. The quantity of GUIs 216 and/or their configuration can depend upon the design and implementation of the access and payment application 215.

The communications and media interface 217 can represent the component of the application 215 that can establish use of the various communication media and/or software applications of the mobile device. For example, an RFID access application can activate the GPS tracking component of the mobile device 210 and the RFID emulator or signal adjuster during a specific time window (which can be preprogrammed by the user for certain hours in the day where he or she may be at the office) to facilitate the use of the mobile device stored office door RFID smartcard emulator application. In such a manner, the mobile device can communicate with the RFID interrogator at the office location via intermediate frequency range RFID emulation to automatically allow the user access into the building. Additional features such as a mobile device camera can be activated that would capture an image associated with a mobile wallet application payment point to be analyzed for a certain set of characteristics to facilitate additional security features as desired.

Mobile device 210 can further include storage device 212 housing RFID application settings 214. Information stored on the data store can be, for example, a list of the RFID signal transmission applications associated with coordinates for RFID reader locations and authorization settings. Authorization settings can be user determined to, in one embodiment, control the level of security when broadcasting account payment information. For example, a user may wish to implement a setting of "always prompt" for his or her American Express contactless smartcard emulation application. This can prevent accidental and unintended use of the financial account for purchases. It should be noted that the security or authorization settings are not limited to the embodiment elaborated upon in the brief example, and other settings and applications for transmitting RFID emulated signals within intermediate frequency range.

Coordinates received from satellite 205 can allow device 210 to determine its location in relation to a pre-programmed RFID interrogator (for example, interrogator X 230 and interrogator Y 240). RFID interrogators 230 and 240 broadcast their respective carrier signals 232, 242 across their respective read range 225 (i.e., NFC range). Any passive RFID tag or NFC device emulating a passive RFID tag signal within the read range can be activated to communicate with interrogators 230 and 240.

Mobile computing device 210 can determine that positioned at location B, it is now geographically located within IFC range 218 of RFID interrogator X 220. The device is still in a geographical position where its own NFC range 222 and interrogator 230 range 225 do not overlap. Even though the device is not receiving carrier signal 232 (as it is still geographically located outside of read range 225), the device can communicate with interrogator X 220. Communications can include utilization of a previously recorded timing sequence (see 180 of FIG. 1) if applicable. IFC range 224 of device 210 at location B overlaps with the reader 230's read range 225. Once IFC range 224 can reach geographical coordinates within read range 225 of RFID interrogator X 230, the device 210 can activate auto-transmission and broadcast of the emulated passive RFID signal 220 for the respective reader 230.

The device can utilize the signal adjuster to boost broadcasting range to IFC range 224 and implement the timing macro discussed in FIG. 1 as necessary. This can result in the broadcast of emulated signal 220 across IFC range 224. In such a manner mobile computing device 210 can now communicate with interrogator X outside of the interrogators read range 225 (NFC range or less) and function as the emulated tag was intended to. The added convenience for the user can be that he or she will no longer have to remove his or her device 210 from its storage place to bring it within close read range 225 of the RFID interrogator 220.

As previously discussed, NFC read ranges are limited to a range of up to roughly 20 centimeters but are often intentionally further restricted to a distance of four centimeters due to security concerns. IFC range 224, however, would negate the security inherent to passive RFID communication: the device would be broadcasting the emulated signal actively and could interact with a reader at much greater distances. Known encryption techniques can be employed for IFC 224 protocols to combat security concerns associated with the IFC 224 signal broadcast. It should be noted that the GPS dependent auto-activation mechanism is one embodiment in accordance with the innovative elements disclosed herein. Other auto-activation mechanisms are contemplated.

In one contemplated embodiment (based on FIG. 2, which is a derivative of FIG. 1), the computing device 210 can be used as a safeguard of a separate RFID article and thus function as a safeguard for unauthorized transactions via the separate RFID card or article. For purposes of the embodiment, it does not matter whether a MAG strip is used for payment.

The payment point can be linked to an internet or telephony network. When it receives a payment request from the "credit card" via the payment point, it looks up user information in a database, and determines a GPS equipped device also associated with the owner. This device can include a navigation system (of the vehicle), a mobile phone, or other such device. The system can then send a "ping" over the network to this device, which in turn can send back its GPS coordinates. When the GPS coordinates are received and indicate that the device is proximate to the physical location of the payment point, the transaction is authorized. Otherwise it is refused.

Thus, a payment artifact is "paired" to a separate user device having location tracking capabilities. A person (unauthorized user) must "steal" the GPS tracked device to use the card successfully, which provides a beacon for locating the thief. Thus, credit card and other similar payment instruments that have historically been subject to high levels of theft, become much more secure financial transaction instruments, using the embodiment described above.

As described, the above embodiment is user transparent—meaning it requires no active actions on behalf of a user. A user may or may not even be aware that an authorization is occurring. In one embodiment, a monitor proximate to the payment point can be equipped with a camera, which can take a picture of the person attempting to utilize the payment artifact.

In one contemplated embodiment, authorization of a proximate device may require active user participation. For example, the device can require a user to enter a dedicated PIN number or a set of characters sent to the user's registered device (which can be separate from the mobile computing device enacting the passive RFID emulation) for added security. Alternatively, biometric identification of the user can occur. The user may, for example, be required to supply a finger or palm print, a retinal scan, a voice sample for voice recognition, and the like.

Figure 3:
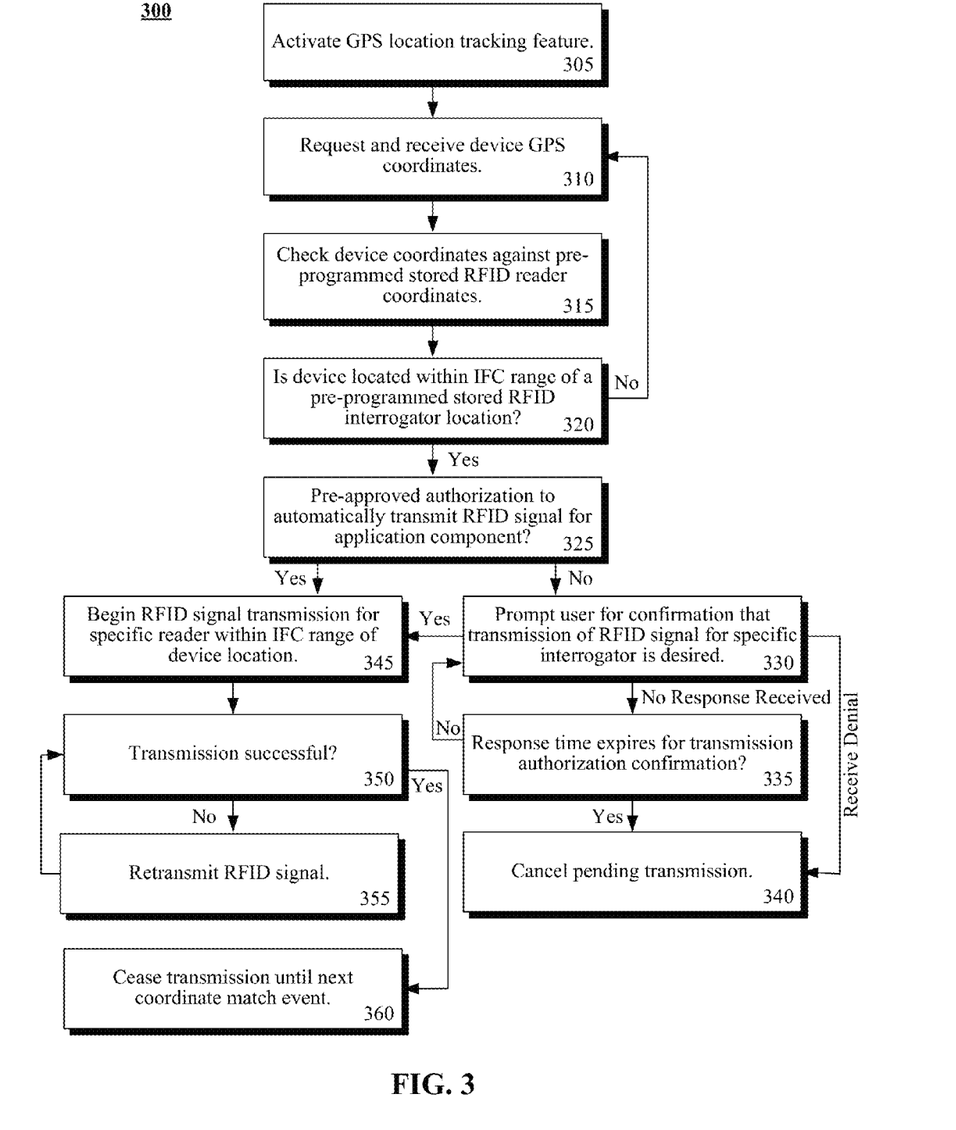
FIG. 3 shows a flowchart of a method from a device perspective through which an embodiment of the disclosure allows for location dependent activation of emulated RFID signal transmission over IFC range.

FIG. 3 shows a flowchart of a method 300 from a device perspective through which an embodiment of the disclosure allows for location dependent activation of emulated RFID signal transmission over IFC range. The flowchart shows a set of steps (steps 305-360) that can occur in accordance with the inventive arrangements disclosed herein to engage in auto activation of RFID signal transmission when the RFID tag emulation device is geographically located within intermediate frequency communication (IFC) range of a pre-programmed and stored RFID interrogators' read ranges.

In step 305, the device can activate the GPS location tracking feature. This will enable real time following or tracking of the device by its geographic location as determined by satellites. In another embodiment, this real time tracking can be achieved utilizing wireless networks in range of the device. It should be noted that while this presents an option it is a less accurate method for determining device location than utilizing GPS data. Other available location detection and tracking techniques are contemplated.

In step 310, the device can request and subsequently receive its geographical location in the form of GPS coordinates. These received location coordinates can, in step 315, be compared to a set of pre-programmed stored RFID reader or interrogator coordinates for which the device is enabled to interact with. These interactions can, for example, serve access control or contactless payment purposes.

In step 320, the device can determine whether the device itself is geographically located within an intermediate field communication (IFC) range of one of the set of pre-programmed stored RFID reader locations. If the device is not geographically located within IFC range the device can return to step 310 and continue requesting the device's geographical location and subsequently (in step 315) checking it against a set of known reader coordinates.

It should be noted that the IFC range determined for each interrogator can be different. Some interrogators (e.g., those dedicated to contactless payment) may, for safety purposes or due to hardware constraints of the reader or its conventionally associated tag, utilize a shorter IFC range. On the other hand, some applications (e.g., toll collection systems) may utilize larger IFC ranges to ensure the system operates correctly.

When it is determined that the device is located within geographical bounds for IFC range transmission of a known RFID interrogator read range, the process can advance to step 325. In step 325, the device performs a check to determine if it has pre-approval to automatically transmit the required RFID signal for the application component. This measure can be optional. It can supply an additional safety check to prevent unintentional transmission. In turn, this can serve to avoid fraudulent or accidental charges to a user's account associated with one or more RFID applications accessible via the mobile computing device.

In the event that the device does not determine pre-approval for transmission exists, the process can progress to step 330. In step 330, the device can prompt the user for confirmation that transmission of the RFID signal for the specific interrogator geographically located within IFC range is desired. If the device received a denial from the user indicating that the transmission is not desired, the process can advance to step 340 and cancel the pending transmission.

Should the device fail to receive a response to the user authorization prompt, in step 335 the device can evaluate whether the response time for receiving transmission authorization has expired. In the event that response time has not expired, the process can continue prompting the user for authorization in step 330. Should the response time have expired, the process can advance to step 340 and cancel the pending signal transmission.

If, in response to step 330, the device receives confirmation from the user that the RFID signal transmission is indeed desired, the process can move to step 345. In step 345, the device can begin transmission of the RFID signal for the specific interrogator located within IFC range of the device location. In step 350, the device can determine whether the transmission of the RFID signal was successful.

In the event that transmission was not successful, the process can move on to step 355 and retransmit the signal. If, however, transmission was successful, in step 360, the device can cease transmission of the RFID signal until the next coordinate match event between the mobile computing device's geographical location and the geographical location of a known RFID interrogator. In the event that the specific RFID reader requires timed responses other than the "answer" to affect access or payment as intended by the application, the timing macro 180 discussed in FIG. 1 can be applied during the signal transmission process.

Additionally, any known encryption processes can be utilized to compensate for the potential safety hazards that can arise due to active broadcasting of emulated passive RFID signals over larger ranges (IFC) versus conventionally available NFC ranges. As highlighted in FIG. 2, one additional safety feature contemplated can be, but is not limited to, the RFID reader being connected to a backbone system and requesting a confirmation of the broadcasting device's ID. This identification and authorization requirement can occur without user input. Confirmation can be in the form of the broadcasting device or a separate registered user device returning GPS location coordinates, which can be subsequently compared to RFID reader coordinates to guarantee the device is registered with the device user and geographically located within a pre-determined IFC range. Other security features that may or may not occur behind the scenes (i.e., hidden from the device user) are contemplated.

Figure 4:
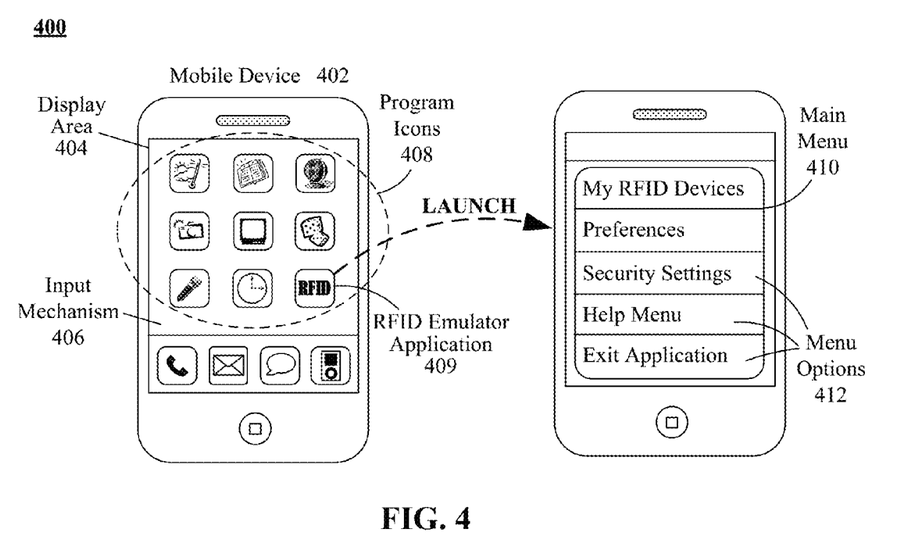
FIG. 4 is a collection of mobile device graphical user interfaces (GUIs) illustrating a sample implementation of the intermediate frequency RFID transmission application in accordance with an embodiment of the inventive arrangements disclosed herein.

FIG. 4 is a collection 400 of mobile device 402 graphical user interfaces (GUIs) illustrating a sample implementation of the intermediate frequency RFID signal transmission application in accordance with embodiments of the inventive arrangements disclosed herein. The GUIs depicted in collection 400 can be utilized within the context of system 100 of FIG. 1 and/or the system 200 of FIG. 2.

Figure 4A:
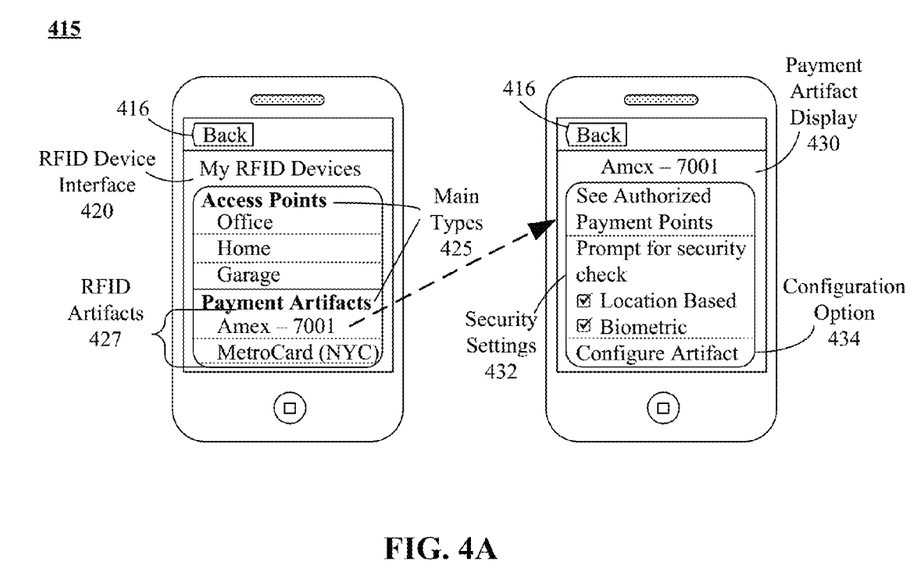
FIG. 4A is a collection of GUIs illustrating additional options for an implementation of an intermediate frequency RFID transmission application in accordance with an embodiment of the inventive arrangements disclosed herein.
Figure 4B:
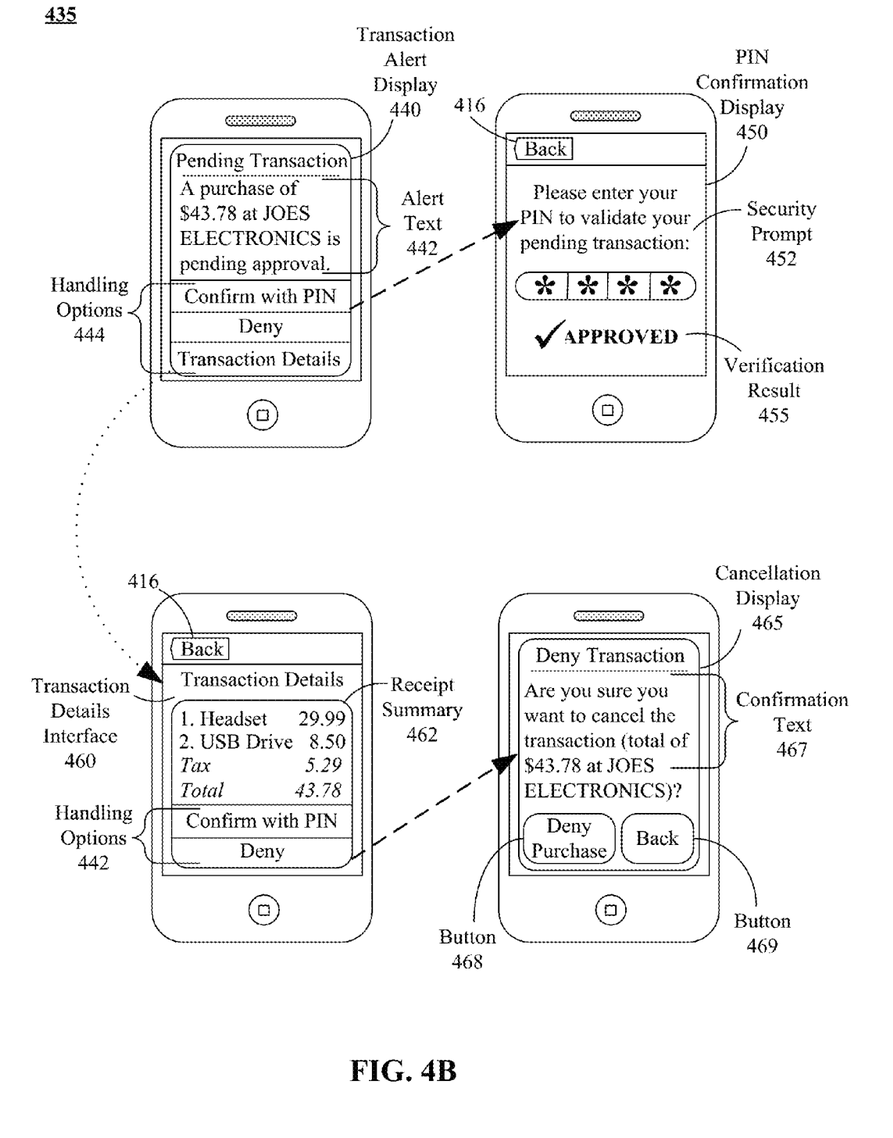
FIG. 4B is a collection of security enhanced intermediate frequency RFID transmission application GUIs for enacting a transaction with an interrogatory in accordance with an embodiment of the inventive arrangements disclosed herein.

It should be appreciated that the GUIs presented in FIGS. 4, 4A, and 4B are for illustrative purposes only, and that additional configurations and functionalities can be incorporated without diverging from this embodiment of the present invention.

In collection 400, a mobile device 402, an iPHONE in this example, can provide access to the intermediate frequency RFID signal transmission application via an RFID emulator application icon 409. The mobile device 402 can include a display area 404 and an input mechanism 406, which, in this example, are one-in-the-same. That is, the display area 404 of an iPHONE 402 can also be used as the input mechanism 406, a touch screen.

The RFID emulator application icon 409 can be presented in addition to other program icons 408, representing other software applications and/or services installed upon the mobile device 402. Selection of the RFID emulator application icon 409 using the input mechanism 406 to launch the RFID emulator application, resulting in the display of the main menu 410.

The main menu 410 can present the user with high-level menu options 412. As shown in this example, the menu options 412 of the main menu 410 can include a "My RFID Devices" option, a preferences option, an option for security settings, a help menu option, and an exit application option.

FIGS. 4A and 4B, each discussed below, can illustrate GUIs specific to the "My RFID Devices" options 412 of the main menu 410 and implementations of the security settings respectively. Selection of the "My RFID Devices" option 412 can present the user with GUIs 420 and 430 such as those shown in FIG. 4A. An implementation of an RFID payment artifact stored in the RFID emulator application 409 (for example a payment artifact transaction) can present the user with GUIs 440, 450, 460, and 465 such as those shown in FIG. 4B.

FIG. 4A is a collection of GUIs illustrating additional options for an implementation of an intermediate frequency RFID transmission application in accordance with an embodiment of the inventive arrangements disclosed herein. FIG. 4A can represent a collection 415 of GUIs 420 and 430 that can be presented to the user after selection of the "My RFID Devices" option 412 from the main menu 410.

The legal advice interface 420 can present the user with various main types 425 of RFID artifacts stored within the RFID emulator application 409 (such as, for example, artifacts grouped into access point devices and payment artifact devices). Selection of a main type 425 can present a list of all sub artifacts 427 within the type 425, when available. It should be noted that a user may add additional artifacts and determine additional main types (for example, a user may wish to group his or her artifacts in categories such as "home", "credit cards", "public transportation" etc.).

A BACK button 416 can also be presented to provide return navigation within the legal matter management application. The functionality of the BACK button 416 need not be incorporated into any specific interface, but can be a function of the overall RFID emulator application 409.

As shown in this example, the "Amex-7001" artifact 427 can be selected, launching payment artifact display 430 on the user's mobile device 402. From the payment artifact display 430, the BACK button 416 can return the user to the "My RFID Devices" interface 420.

As shown in this example, payment artifact display 430 can include various sections, for example, security settings 432 and payment artifact 427 specific configuration options 434. Security settings can be specific to the selected artifact 427 and can include a number of options such as location based security checks, biometric checks, and the like, to verify a transaction utilizing payment artifact 427 via RFID emulator application 409. It should be noted that in one embodiment security options can be linked to the amount of the transaction (such as "always allow transaction if less than $20.00") or specific vendors (for example, "always allow transaction to refill public transportation artifact MetroCard-NY"), and the like.

Additional options for presentation within the payment artifact display 430 can be, for example, hyperlinks, images, playable audio and/or video, uniform resource locators (URLs), and the like. These additional options can, for example, link a user to a current offer using the payment artifact (such as a free 12 oz drink with a 21 oz drink purchase when using a STARBUCKS payment artifact), link a user to his or her statement for the payment artifact (such as a credit card statement showing the current balance), and the like. However, since the RFID emulator application is designed to operate on a mobile device 402, resource constraints such as memory space should be considered.

FIG. 4B is a collection 435 of security enhanced intermediate frequency RFID transmission application GUIs for enacting a transaction with an interrogatory in accordance with an embodiment of the inventive arrangements disclosed herein. FIG. 4B can represent a collection 435 of GUIs 440, 450, 460, and 465 that can be presented to the user after a transaction has been automatically initiated by the RFID emulation application 409 on mobile device 402 (such as, for example, with payment artifact 427 "Amex-7001" of FIG. 4A). When additional user verification is deemed necessary to ensure proper security is enacted for an IFC range RFID emulation payment application, transaction alert display 440 can be presented to the mobile device 402 user.

Transaction alert display 440 can include alert text 442 with details of the IFC range RFID signal initiated pending transaction (for example with information on the total purchase price details and the business with which the transaction is pending, and the like), as well as handling options 444. Handling options 144 can include options such as "confirm with PIN", "deny", and "transaction details".

Selection of the "confirm with PIN" handling option 442 can result in the user being presented with PIN confirmation display 450. PIN confirmation display 450 can include security prompt 452 informing the user of the required action to take to respond to the interrogatory for transaction security for the IFC emulated RFID signal initiated purchase. Should a user correctly enter his or her PIN in this example verification result 455 can be presented. Additional options such as a "View Receipt" button in the case of correct verification are contemplated to be shown along with the verification result 455. A BACK button 416 can return the user to the initial transaction alert display 440.

Upon user selection of the "Transaction Details" handling option 442, the user can be presented with transaction details interface 460 which can include a back button to return to transaction alert display 440, as well as a receipt summary 462 and additional handling options 442. Receipt summary 462 can, in one embodiment, include an itemized list of items within the transaction as well as any additional charges (potential taxes, shipping, gratuities when applicable, etc.). Handling options 442 in the transactions details interface 460 can facilitate purchase confirmation or denial without requiring the user to return to the initial transaction alert display 440.

User selection of the "Deny" option 442 can result in the user being presented with cancellation display 465. Cancellation display 465 can include confirmation text 467 which can ask the user to confirm that he or she wishes to deny the via IFC RFID emulation communication automatically initiated transaction. Button 468 can allow the user to deny the purchase, whereas button 469 allows the user to return to the transaction details interface 460 or the transaction alert display 440. It should be noted that the above described security enhancements and utilization of the IFC RFID emulator application (more specifically details of a security enhanced embodiment requiring a user input responsive to an automatically generated interrogatory as discussed in FIG. 4B) are not intended to be limiting and other options are contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
recording transmission information specific to a passive RFID device within a non-transitory storage medium of a powered mobile device, wherein the powered mobile device comprises one or more processors, program instructions stored in the non-transitory storage medium, a battery, and a touch-screen display for human-to-device interactions, wherein the passive RFID device is an unpowered device that is able to gain temporarily power through electromagnetic induction to transmit a radio frequency signal to a near field communication (NFC) reading device, wherein the NFC reading device transmits a radio frequency signal received by passive RFID devices, which include said passive RFID device, used to power the passive RFID devices through electromagnetic induction;
during a programming stage for emulating the radio frequency signal, the powered mobile device recording signals being sent to the NFC reading device along with signal specific timing information, wherein the timing information is used as part of a communication sequence, when emulating passive RFID signals exchanged with the NFC reading device, wherein when the powered mobile device is outside an NFC range of the NFC reading device, the timing information is used to emulate the communication sequence within an intermediate frequency communication (IFC) range;
configuring the powered mobile device for the intermediate frequency communication range, wherein the intermediate frequency range is at least a magnitude of five times greater than the NFC range at which the passive RFID device is able to receive the radio frequency signal from the NFC reading device; and
transmitting a transmission signal with the transmission information encoded within, wherein the transmitting is from the powered mobile device to the NFC reading device, wherein the transmitting occurs when the powered mobile device is outside the NFC range but within the IFC range, wherein the transmission signal emulates a passive RFID signal that would have been generated by the passive RFID device if the passive RFID device were placed within the NFC range of the NFC reading device, wherein the transmission signal is one of a plurality signals transmitted by the powered mobile device to the NFC reading device, wherein the plurality of signals are transmitted by the powered mobile device in accordance with the timing information of the programming stage, wherein the NFC reading device responds to the transmission signal from the powered mobile device as if an equivalent signal containing the transmission information were sent from the passive RFID device.

2. The method of claim 1, wherein communications protocols and data exchange formats of the data contained within the transmission signal from the powered mobile device as well as a frequency used for the transmission signal conforms to an International Organization for Standardization (ISO) 14443 based standard.

3. The method of claim 1, further comprising:
wherein the transmitting of the transmission signal by the powered mobile device occurs automatically responsive to the receiving of the radio frequency signal without requiring manual interactions by a user of the powered mobile device.

4. The method of claim 1, wherein the powered mobile device comprises a global positioning signal (GPS) component, said method further comprising:
detecting, by one of the processors of the powered mobile device executing a subset of the program instructions, based on a current position of the powered mobile device as determined by positioning data from the GPS component, that the powered mobile device has entered within IFC range of the NFC reading device, wherein the transmitting of the transmission signal by the powered mobile device occurs automatically responsive to the detecting that the current position is within IFC range of the NFC reading device without requiring manual interactions by a user of the powered mobile device.

5. The method of claim 1, wherein the IFC range is a range between one foot and ten yards.

6. The method of claim 1, wherein the transmission signal is generated by a WIFI transceiver of the powered mobile device.

7. The method of claim 1, wherein the one or more processors do not process information of a radio frequency signal generated by the NFC reading device as part of the communication sequence when the powered mobile device is in IFC range and is emulating the passive RFID signals using the plurality of signals and the timing information.

8. The method of claim 1, wherein the transmitting of the transmission signal occurs in response to a user received input via the touch-screen to manually emulate the passive RFID signals exchanged with the NFC reading device using the powered mobile device operating outside the NFC range.

9. The method of claim 1, wherein an ability to emulate the passive RFID signal of the passive RFID device results from installation of a passive-RFID-device-emulation application on the powered mobile device, wherein upon being installed on the powered mobile device, the passive-RFID-device-emulation application is available within a set of user selectable applications accessible via the touch-screen.

10. The method of claim 1, wherein the configuring of the IFC range establishes a user-configured maximum range, which is less than a range at which hardware of the powered mobile device is technologically able to operate, which is established for security purposes.

11. The method of claim 1, further comprising:
presenting a graphical user interface upon the touch-screen display of the powered mobile device, wherein the graphical user interface is for emulating the passive RFID device using the powered mobile device, wherein the recording, the configuring, and the transmitting occur in response to user-to-machine interactions occurring via the graphical user interface.

12. The method of claim 1, wherein the powered mobile device emulates a plurality of different passive RFID devices used with a plurality of different NFC reading devices, wherein the powered mobile device records different transmission information for emulating each of the different passive RFID devices.

13. A system comprising:
one or more processors;

one or more non-transitory storage mediums; and
program instructions stored on the one or more non-transitory storage mediums, wherein the one or more processors execute the program instructions to:
record transmission information specific to a passive RFID device for a powered mobile device, wherein the passive RFID device is an unpowered device that is able to gain temporarily power through electromagnetic induction to transmit a radio frequency signal to a near field communication (NFC) reading device, wherein the NFC reading device transmits a radio frequency signal received by passive RFID devices, which include said passive RFID device, used to power the passive RFID devices through electromagnetic induction;
during a programming stage for emulating the radio frequency signal, record signals being sent to the NFC reading device along with signal specific timing information, wherein the timing information is used as part of a communication sequence, when emulating the passive RFID signal exchanged with the NFC reading device, wherein when the powered mobile device is outside an NFC range of the NFC reading device, the timing information is used to emulate the communication sequence within an intermediate frequency communication (IFC) range;
configure the powered mobile device for the intermediate frequency communication range, wherein the intermediate frequency range is at least a magnitude of five times greater than the NFC range at which the passive RFID device is able to receive the radio frequency signal from the NFC reading device; and
transmit a transmission signal with the transmission information encoded within, wherein the transmitting is from the powered mobile device to the NFC reading device, wherein the transmitting occurs when the powered mobile device is outside the NFC range but within the IFC range, wherein the transmission signal emulates a passive RFID signal that would have been generated by the passive RFID device if the passive RFID device were placed within the NFC range of the NFC reading device, wherein the transmission signal is one of a plurality signals transmitted by the powered mobile device to the NFC reading device, wherein the plurality of signals are transmitted by the powered mobile device in accordance with the timing information of the programming stage, wherein the NFC reading device responds to the transmission signal from the powered mobile device as if an equivalent signal containing the transmission information were sent from the passive RFID device.

14. The system of claim 13, wherein communications protocols and data exchange formats of the data contained within the transmission signal from the powered mobile device as well as a frequency used for the transmission signal conforms to an International Organization for Standardization (ISO) 14443 based standard.

15. A computer program product comprising:
one or more non-transitory storage mediums,
program instructions stored on the one or more non-transitory storage mediums, wherein the program instructions are able to be executed by one or more processors execute the program instructions to:
record transmission information specific to a passive RFID device for a powered mobile device, wherein the passive RFID device is an unpowered device that is able to gain temporarily power through electromagnetic induction to transmit a radio frequency signal to a near field communication (NFC) reading device, wherein the NFC reading device transmits a radio frequency signal received by passive RFID devices, which include said passive RFID device, used to power the passive RFID devices through electromagnetic induction;
during a programming stage for emulating the radio frequency signal, record signals being sent to the NFC reading device along with signal specific timing information, wherein the timing information is used as part of a communication sequence, when emulating the passive RFID signal exchanged with the NFC reading device, wherein when the powered mobile device is outside an NFC range of the NFC reading device, the timing information is used to emulate the communication sequence within an intermediate frequency communication (IFC) range;
configure the powered mobile device for the intermediate frequency communication range, wherein the intermediate frequency range is at least a magnitude of five times greater than the NFC range at which the passive RFID device is able to receive the radio frequency signal from the NFC reading device; and
transmit a transmission signal with the transmission information encoded within, wherein the transmitting is from the powered mobile device to the NFC reading device, wherein the transmitting occurs when the powered mobile device is outside the NFC range but within the IFC range, wherein the transmission signal emulates a passive RFID signal that would have been generated by the passive RFID device if the passive RFID device were placed within the NFC range of the NFC reading device, wherein the transmission signal is one of a plurality signals transmitted by the powered mobile device to the NFC reading device, wherein the plurality of signals are transmitted by the powered mobile device in accordance with the timing information of the programming stage, wherein the NFC reading device responds to the transmission signal from the powered mobile device as if an equivalent signal containing the transmission information were sent from the passive RFID device.

16. The computer program product of claim 15, wherein the IFC range is a range between one foot and ten yards.

17. The system of claim 13, wherein the transmission signal is generated by a WIFI transceiver of the powered mobile device.

18. The computer program product of claim 15, wherein the powered mobile device comprises a global positioning signal (GPS) component, said computer program product further comprising program instructions stored on the one or more non-transitory storage mediums, wherein the program instructions are able to be executed by one or more processors execute the program instructions to:
detect, based on a current position of the powered mobile device as determined by positioning data from the GPS component, that the powered mobile device has entered within IFC range of the NFC reading device, wherein the transmitting of the transmission signal by the powered mobile device occurs automatically responsive to the detecting that the current position is within IFC range of the NFC reading device without requiring manual interactions by a user of the powered mobile device.

19. The computer program product of claim 15, wherein an ability to emulate the passive RFID signal of the passive RFID device results from installation of a passive-RFID-device-emulation application on the powered mobile device, wherein upon being installed on the powered mobile device, the passive-RFID-device-emulation application is available within a set of user selectable applications accessible via the touch-screen.

20. The computer program product of claim 15, further comprising program instructions stored on the one or more non-transitory storage mediums, wherein the program instructions are able to be executed by one or more processors execute the program instructions to present a graphical user interface upon the touch-screen display of the powered mobile device, wherein the graphical user interface is for emulating the passive RFID device using the powered mobile device, wherein the transmitting of the transmission signal occur in response to user-to-machine interactions occurring via the graphical user interface.

* * * * *